United States Patent
Cheng et al.

(10) Patent No.: US 9,482,219 B2
(45) Date of Patent: Nov. 1, 2016

(54) HEAT DISSIPATION MODULE

(71) Applicants: INVENTEC (PUDONG) TECHNOLOGY CORPORATION, Shanghai (CN); INVENTEC CORPORATION, Taipei (TW)

(72) Inventors: Yi-Lun Cheng, Taipei (TW); Chih-Kai Yang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 463 days.

(21) Appl. No.: 14/227,985

(22) Filed: Mar. 27, 2014

(65) Prior Publication Data

US 2015/0152858 A1 Jun. 4, 2015

(30) Foreign Application Priority Data

Nov. 29, 2013 (CN) .......................... 2013 1 0631636

(51) Int. Cl.
| | |
|---|---|
| *H02K 33/00* | (2006.01) |
| *F04D 33/00* | (2006.01) |
| *F04B 45/04* | (2006.01) |
| *F04B 45/047* | (2006.01) |
| *G06F 1/20* | (2006.01) |

(52) U.S. Cl.
CPC ............. *F04B 45/04* (2013.01); *F04B 45/047* (2013.01); *G06F 1/20* (2013.01)

(58) Field of Classification Search
CPC .. H02K 33/10; H02K 33/12; F04D 25/0606; F04D 33/00; F04D 17/16; F04B 45/047; F04F 7/00; F04C 9/002; G06F 1/20
USPC ............. 310/15–17, 20, 25, 36, 77; 417/436
See application file for complete search history.

(56) References Cited

U.S. PATENT DOCUMENTS

| | | | | |
|---|---|---|---|---|
| 5,522,712 | A * | 6/1996 | Winn ....................... | F04D 33/00 310/25 |
| 9,163,624 | B2 * | 10/2015 | Chen ...................... | F04B 45/047 310/25 |
| 2009/0072637 | A1 * | 3/2009 | Chang ..................... | F04D 33/00 310/36 |
| 2009/0121567 | A1 * | 5/2009 | Chou .................. | F04D 25/0606 310/77 |

* cited by examiner

*Primary Examiner* — Tran Nguyen
(74) *Attorney, Agent, or Firm* — Huffman Law Group, PC

(57) ABSTRACT

A heat dissipation module includes an electro-magnetic member, an elastic member and a magnetic member. The electro-magnetic member is configured for generating a periodic magnetic field. The elastic member includes a fixed end, a free end and multiple blades for expanding or closing; and the blades are located between the fixed end and the free end. The magnetic member is disposed on the free end and configured for reciprocating due to being magnetically induced by the periodic magnetic field so as to drive the plurality of blades to produce an air current.

10 Claims, 3 Drawing Sheets

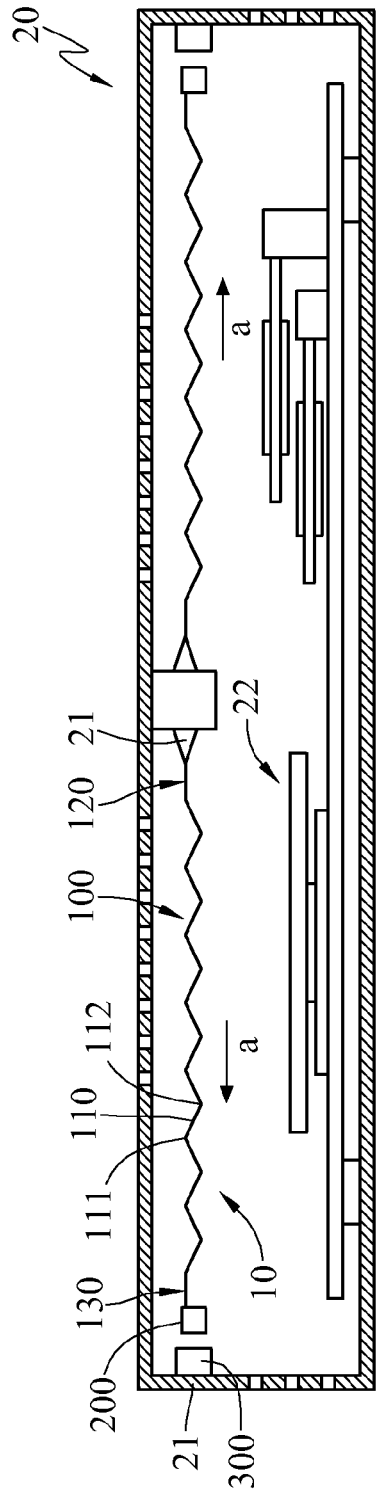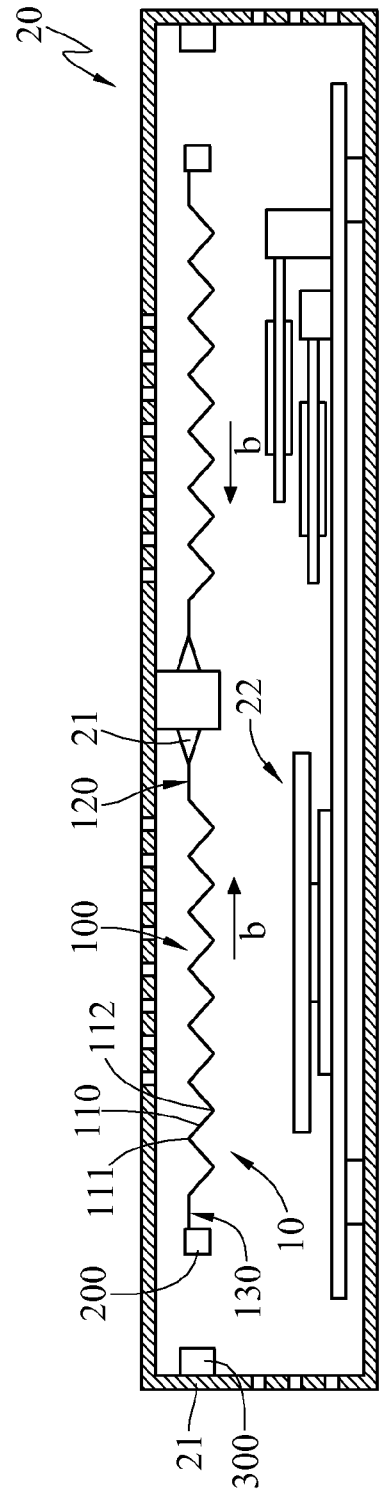

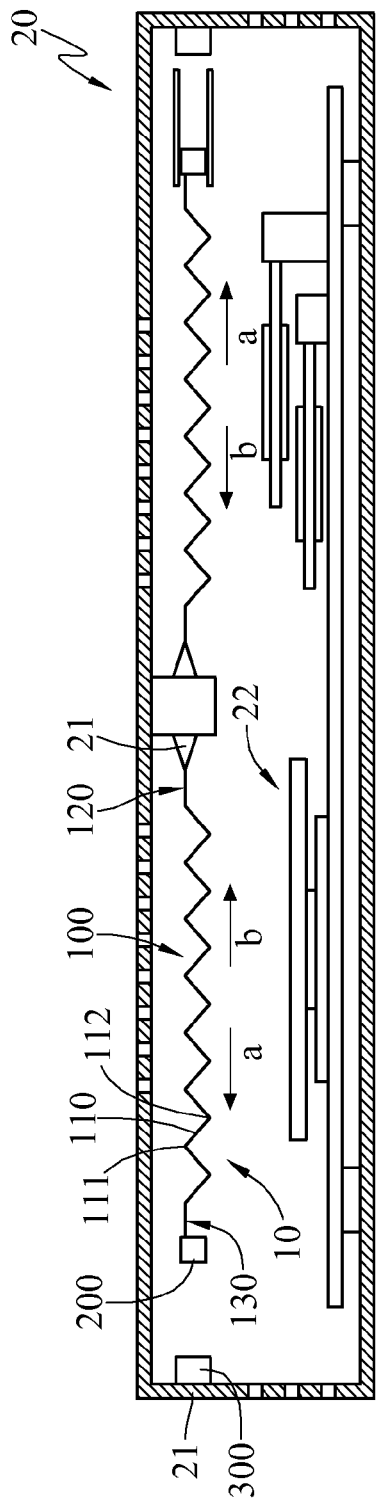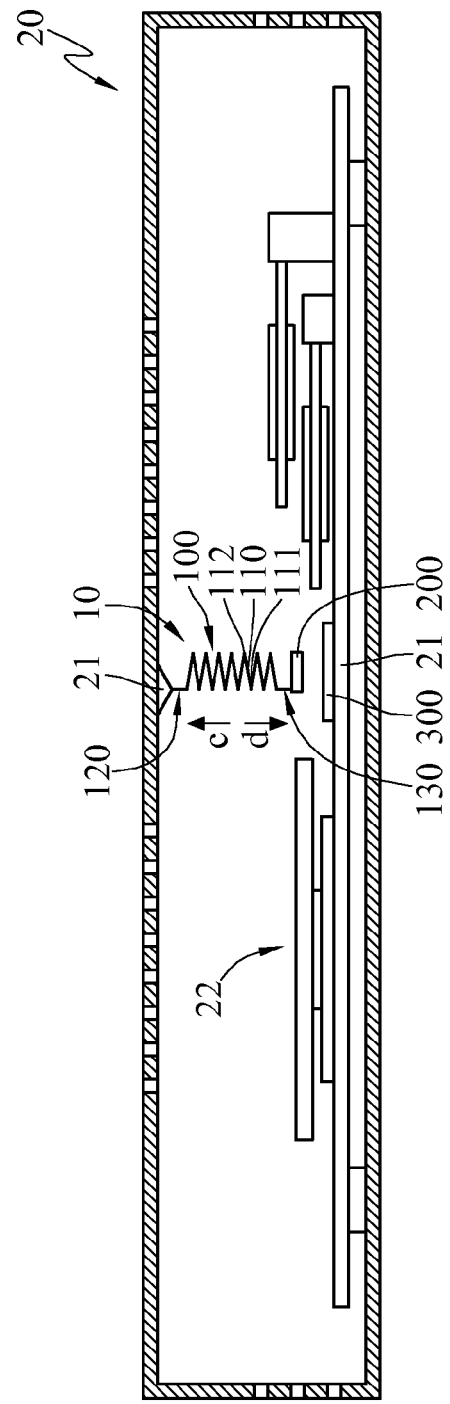

HEAT DISSIPATION MODULE

CROSS-REFERENCE TO RELATED APPLICATIONS

This non-provisional application claims priority under 35 U.S.C. §119(a) on Patent Application No(s). 201310631636.1 filed in China on Nov. 29, 2013, the entire contents of which are hereby incorporated by reference.

BACKGROUND OF THE INVENTION

1. Technical Field of the Invention

The disclosure relates to a heat dissipation module, and more particularly to, a bladeless heat dissipation module.

2. Description of the Related Art

When operating, computer systems, such as personal computer or server, may bring wasted heat accordingly. The amount of the wasted heat may vary based on the operating time and efficiency of the computer system. When the wasted heat is increased and accumulated within the computer system, it may raise the temperature to affect the performance of the computer system, even causing failure. Thus, in general, a heat dissipation module is employed in the computer system for removing the wasted heat generated by the operation of the computer system.

Speaking of the heat dissipation devices, the devices may be classified into two types. One is air-cooling type, and the other is liquid-cooling type. For example, the air-cooling heat dissipation device comprises an axial fan, and the liquid-cooling heat dissipation device comprises a liquid pipe and a pump. However, the cost of the liquid-cooling type is greater than the air-cooling type. Thus, take the cost into consideration, manufacturers generally prefer the air-cooling heat dissipation device being disposed in the computer system rather than the liquid-cooing type. Although the axial fan has advantages in cost, when the fan is used for a long time or the design is improper, the operation of the axial fan may generate frictions and shakes between a shaft and a sleeve of the axial fan. The abrasions and shakes may result in noise and reduce the fatigue of the axial fan, thereby shortening the lifespan of the axial fan.

SUMMARY OF THE INVENTION

An embodiment of the disclosure provides a heat dissipation module comprising an electro-magnetic member, an elastic member and a magnetic member. The electro-magnetic member is configured for generating a periodic magnetic field. The elastic member includes a fixed end, a free end and a plurality of blades for expanding or closing; and the plurality of blades are located between the fixed end and the free end. The magnetic member is disposed on the free end and configured for reciprocating due to being magnetically induced by the periodic magnetic field so as to drive the plurality of blades to produce an air current.

Another embodiment of the disclosure provides a heat dissipation module comprising two electro-magnetic members, an elastic member and two magnetic members. The two electro-magnetic members are configured for generating two periodic magnetic fields. The elastic member includes two free ends and a plurality of blades for expanding and closing, and the plurality of blades are located between the two free ends. The two magnetic members are disposed on the two free ends of the elastic member and configured for reciprocating due to being magnetically induced by the two periodic magnetic fields so as to drive the plurality of blades to produce an air current.

BRIEF DESCRIPTION OF THE DRAWINGS

The present disclosure will become more fully understood from the detailed description given hereinbelow, along with the accompanying drawings which are for illustration only, thus are not limitative of the present disclosure, and wherein:

FIG. 1 is a side view of a heat dissipation module located inside an electronic device according to a first embodiment of the disclosure;

FIG. 2 is a side view of an electro-magnetic member and a magnetic member being magnetically repulsive to each other in FIG. 1;

FIG. 3 is a side view of a heat dissipation module located inside an electronic device according to a second embodiment of the disclosure;

FIG. 4 is a side view of a heat dissipation module located inside an electronic device according to a third embodiment of the disclosure.

DETAILED DESCRIPTION

Figure 5:
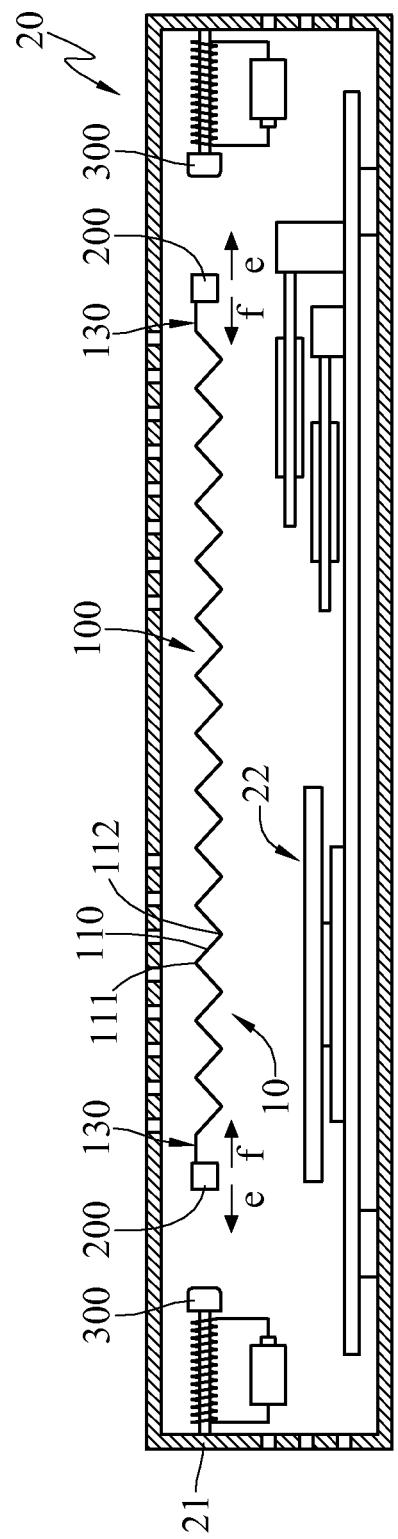
FIG. 5 is a side view of a heat dissipation module located inside an electronic device according to a fourth embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIGS. 1 and 2, FIG. 1 is a side view of a heat dissipation module located inside an electronic device according to a first embodiment of the disclosure, and FIG. 2 is a side view of an electro-magnetic member and a magnetic member being magnetically repulsive to each other in FIG. 1. The above-mentioned electronic device 20 is, for example, laptop computer, desktop computer or tablet computer, but the disclosure is not limited thereto. The electronic device 20 includes two fixed portions 21 and at least one heat source 22. In this embodiment, the two fixed portions 21 are both mounted on a casing of the electronic device 20, but the locating position is not limited to the disclosure. The heat source 22 is located inside the casing of the electronic device 20.

In this embodiment, the heat dissipation module 10 comprises an elastic member 100, a magnetic member 200 and an electro-magnetic member 300.

The elastic member 100 includes a fixed end 120 and a free end 130 that are opposite to each other. The fixed end 120 is fixedly mounted on one of the two fixed portion 21, and the free end 130 is movably mounted inside the electronic device 20, such that the elastic member 100 extends horizontally and located above the heat source 22. Moreover, in this embodiment, the free end 130 is movably mounted inside the electronic device 20 by a combination of a sliding rail and slide rack, but the manner how the free end 130 is movably located inside the electronic device 20 is not limited to the disclosure.

The elastic member 100 has a plurality of blades 110 which respectively bend to extend. The blades 110 are all mounted between the fixed end 120 and the free end 130. In this embodiment, each blade 110 has a first end 111 and a second end 112 that are opposite to each other. The first end 111 of one of the blades 110 is connected to the second end 112 of another one of the blade 110 adjacent thereto, and the second end 112 blade 110 of the blade 110 is connected to the first end 111 of another one of the other blade 110 adjacent thereto. Furthermore, the free end 130 of the elastic member 100 is normally away from the fixed end 120 of the elastic member 100 because of its elasticity (along the indicating direction of the arrow a).

The magnetic member 200 is disposed on the free end 130 of the elastic member 100. For example, the magnetic member 200 is a magnet, an electromagnet or a magnetic coil. In this embodiment, the magnetic member 200 is a magnet.

The electro-magnetic member 300 is mounted on the other fixed portion 21. For example, the electro-magnetic member 300 is an electromagnet. In this embodiment, the electro-magnetic member 300 is electrified to be configured for generation of a periodic magnetic field such that a magnetic reaction between the magnetic member 200 and the electro-magnetic member 300 is produced. The magnetic reaction is that when being magnetically repulsive to each other, the two members may repel each other; when having opposite poles, respectively, the two members attract to each other. In this embodiment, This magnetic reaction may drive the free end 130 of the elastic member 100 to move towards the fixed end 120 (along the indicating direction of the arrow b) so as to compress the elastic member 100. Under receiving the resultant forces combined from the repelling force by the magnetic reaction with the compression force, the free end 130 of the elastic member 100 is moved reciprocally in relative to the fixed end 120 such that each blade 110 of the elastic member 100 is configured for expanding or closing relatively, thereby producing an air current flowing along the vertical direction in the figures to perform heat dissipation on the heat source 22 inside the electronic device 20.

Please refer to FIG. 3, which is a side view of a heat dissipation module located inside an electronic device according to a second embodiment of the disclosure. This second embodiment is similar to the above-mentioned embodiment in FIG. 1, therefore only the differences are described herein. In this embodiment, by the elastic force, the free end 130 of the elastic member 100 is normally closer to the fixed end 120 of the elastic member 100 (along the indicating direction of the arrow a) than the locating position in the first embodiment in FIG. 1.

In this embodiment, the electro-magnetic member 300 generates a periodic magnetic field after being electrified so as to produce the magnetic reaction between the magnetic member 200 and the electro-magnetic member 300. In this embodiment, this magnetic reaction drives the free end 130 of the elastic member 100 to move away from the fixed end 120 (along the indicating direction of the arrow b) such that the elastic member 100 is extended. Under receiving the resultant forces combined from the attracting forces by the magnetic reaction with the extending forces, the free end 130 of the elastic member 100 is moved reciprocally in relative to the fixed end 120 such that each blade 110 of the elastic member 100 is configured for closing or expanding relatively to produce an air current flowing in a vertical direction in the figure for heat dissipation on the heat source 22 inside the electronic device 20.

Please refer to FIG. 4, which is a side view of a heat dissipation module located inside an electronic device according to a third embodiment of the disclosure. This third embodiment is similar to the above-mentioned embodiment in FIG. 1, therefore, only the difference is described herein. The difference is that the heat dissipation module 10 in this embodiment is configured for extending vertically and located at a side of the heat source 22. The magnetic member 200 is configured for reciprocating due to being magnetically induced by the periodic magnetic field (i.e., moving in relative to the electronic device 20 along the indicating directions of the arrow c and d) so as to drive the heat dissipation module 10 to produce an air current flowing along a horizontal direction, thereby performing heat dissipation on the heat source 22 inside the electronic device 20.

Please refer to FIG. 5, which is a side view of a heat dissipation module located inside an electronic device according to a fourth embodiment of the disclosure. This fourth embodiment is similar to the above-mentioned embodiment in FIG. 1, therefore, only the difference is described herein. In this fourth embodiment, the heat dissipation module 10 comprises an elastic member 100, two magnetic members 200 and two electro-magnetic members 300. The elastic member 100 is movably mounted inside the electronic device 20 and located above the heat source 22. The elastic member 100 includes two free ends 130 opposite to each other. The two free ends 130 of the elastic member 100 are configured for being normally closer or farther away from each other, but the locating positions are not limited to the disclosure. In this embodiment, the two free ends 130 are farther away from each other (along the indicating direction of the arrow e). The elastic member 100 includes a plurality of blades 110 bending to extend. The blades 110 are mounted between the two free ends 130. The two magnetic members 200 are fixedly mounted at the two free ends 130 of the elastic member 100. For example, the two electro-magnetic members 300 are induction coils and fixedly mounted on the two fixed portions 21. After being electrified, the two electro-magnetic members 300 may generate two periodic magnetic fields, respectively, so as to generate the two magnetic reactions. These two magnetic reactions drive the two magnetic members 200 to compress the elastic member 100, respectively. Under receiving the resultant force combined from the magnetic force by the magnetic reaction with the elastic force, the magnetic members 200 are configured for reciprocating due to being magnetically induced by the periodic magnetic field (i.e., reciprocally moving in relative to the electronic device 20), which drives the blades 110 to expand or close with each other to produce an air current flowing in a vertical direction for heat dissipation.

To sum up, in the heat dissipation module according to the embodiments of the disclosure, the magnetic reaction between the magnetic member and the electro-magnetic member and the elastic force from the elastic member together drive each blade of the elastic member to expand or close with each other so as to produce the air current to perform heat dissipation on the heat source.

In the heat dissipation module according to the embodiments of the disclosure, the air current for heat dissipation is generated by both the magnetic force and the elastic force, which is literally different from the conventional axial-fan-type heat dissipation module. Therefore, the heat dissipation module of the disclosure solves the problem that the axial fan has noise pollution and short life span because the abrasion and shakes between the shaft and the sleeve of the axial fan are generated during operation.

What is claimed is:
1. A heat dissipation module, comprising:
two electro-magnetic members configured for generating two periodic magnetic fields;

an elastic member including two free ends and a plurality of blades for expanding and closing, and the plurality of blades being located between the two free ends; and two magnetic members disposed on the two free ends of the elastic member and configured for reciprocating due to being magnetically induced by the two periodic magnetic fields so as to drive the plurality of blades to produce an air current.

2. The heat dissipation module according to claim 1, wherein the heat dissipation module is disposed on two fixed portions of an electronic device, and the two electro-magnetic members are fixedly mounted on the two fixed portions, respectively.

3. The heat dissipation module according to claim 1, wherein each of the plurality of blades includes a first end and a second end that are opposite to each other, the first end of one of the blades is connected to the second end of another one of the blade adjacent thereto, and the second end of one of the blades is connected to the first end of another one of the other blade adjacent thereto.

4. The heat dissipation module according to claim 1, wherein the two free ends of the elastic member are normally away from each other, and the two magnetic members and the two electro-magnetic members are magnetically repulsive to each other.

5. The heat dissipation module according to claim 1, wherein the two free ends of the elastic member are normally close to each other, and the two magnetic members and the two electro-magnetic members are magnetically attractive to each other.

6. A heat dissipation module, comprising:

an electro-magnetic member configured for generating a periodic magnetic field;

an elastic member including a fixed end, a free end and a plurality of blades for expanding or closing; and the plurality of blades being located between the fixed end and the free end; and a magnetic member disposed on the free end and configured for reciprocating due to being magnetically induced by the periodic magnetic field so as to drive the plurality of blades to produce an air current.

7. The heat dissipation module according to claim 6, wherein the heat dissipation module is disposed on two fixed portions of an electronic device, the fixed end is fixedly mounted on one end of the two fixed portions, the electro-magnetic member is fixedly mounted on the other fixed portion, and the free end is movably disposed inside the electronic device.

8. The heat dissipation module according to claim 6, wherein each of the plurality of blades includes a first end and a second end that are opposite to each other, the first end of one of the blades is connected to the second end of another one of the blades adjacent thereto, and the second end of one of the blades is connected to the first end of another one of the other blades adjacent thereto.

9. The heat dissipation module according to claim 6, wherein the free end of the elastic member is normally away from the fixed end of the elastic member, and the magnetic member and the electro-magnetic member are magnetically repulsive to each other.

10. The heat dissipation module according to claim 6, wherein the free end of the elastic member is normally close to the fixed end of the elastic member, and the magnetic member and the electro-magnetic member are magnetically attractive to each other.

* * * * *